(12) United States Patent
Irisawa

(10) Patent No.: US 6,431,354 B1
(45) Date of Patent: Aug. 13, 2002

(54) PICTURE FRAME TYPE COVER FOR DISK STORAGE CASE

(75) Inventor: Hideaki Irisawa, Tokyo (JP)

(73) Assignee: Sanriki Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/706,687

(22) Filed: Nov. 7, 2000

(51) Int. Cl.[7] .......................... B65D 85/07; A47G 29/00
(52) U.S. Cl. ...................... 206/309; 206/308.1; 211/40; 211/41.12
(58) Field of Search ................. 206/308.1, 309, 206/387.1; 211/40, 41.12; D6/407, 632, 634

(56) References Cited

U.S. PATENT DOCUMENTS

| | | | | |
|---|---|---|---|---|
| 4,928,818 A | * | 5/1990 | Friess et al. ................ | 206/309 |
| 4,948,022 A | * | 8/1990 | VanDyke ................. | 206/387.1 |
| 5,191,983 A | * | 3/1993 | Hardy ........................ | 211/40 |
| 5,685,439 A | * | 11/1997 | Luesner ...................... | 211/40 |
| 5,996,815 A | * | 12/1999 | Walters et al. ............... | 211/40 |
| 6,112,910 A | * | 9/2000 | Baxter ........................ | 211/40 |

* cited by examiner

Primary Examiner—Bryon P. Gehman
(74) Attorney, Agent, or Firm—Rader, Fishman & Grauer, PLLC

(57) ABSTRACT

A picture frame type cover for a disk storage case includes a front surface frame, an upper press plate, an upper surface plate, a lower press plate, a lower surface plate and a stopper. The front surface frame has an opening. The upper press plate is disposed via the upper surface plate and is connected to an upper end of the front surface frame. The lower press plate is disposed via the lower surface plate and is connected to a lower end of the front surface frame. The front surface frame, the upper press plate, the upper surface plate, the lower press plate and the lower surface plate are connected to form a generally C-shaped configuration defining an opposing pair of generally C-shaped openings. The stopper is formed on one end of the lower surface plate and projects into one of the pair of generally C-shaped openings.

16 Claims, 4 Drawing Sheets

PICTURE FRAME TYPE COVER FOR DISK STORAGE CASE

BACKGROUND OF THE INVENTION

The present invention relates to a picture frame type cover for a disk storage case for standing, hanging or exhibiting a case which contains disks such as a compact disk (CD), a mini disk (MD), and a digital video disk (DVD).

As a conventional case for selling or storing various disks such as CD, MD, and DVD, in general a storage case formed by synthetic resin has been used. The disk storage case is structured such that a main body is rotatably connected to a lid in a side end portion, and a disk containing tray is fitted inside the main body. Held inside the lid is a jacket on which not only a title and explanation but also a photograph, picture, diagram, and the like are displayed. For the disk containing tray fitted inside the main body, a disk holding portion protruded from a middle portion is fitted into a disk through hole, and a disk recording surface is held in a floated state and a non-contact manner. Moreover, for the disk storage case, at least the lid is formed as a transparent member in such a manner that the attached jacket is visible.

The photograph, picture, diagram, and the like of the jacket are high in artistic properties, and the photograph or the picture is worth exhibiting alone to be appreciated, and can always be enjoyed as a part of interior design. However, the disk storage case is a case for containing the disk, and is not formed in a structure to be exhibited. Therefore, to exhibit the disk storage case, the case has to be leaned against a wall or the like. Only by leaning the case against the wall or the like in this manner, the case cannot be exhibited in an arbitrary place, and is unsuitable for appreciation.

Moreover, in order to exhibit the jacket itself, a method of taking the jacket out of the disk storage case and putting the jacket in a photograph stand or a picture frame, or another method has to be performed. When the jacket is taken out of the disk storage case, a problem arises that the jacket is separated from the disk storage case.

Furthermore, since the disk storage case is formed of a thin synthetic resin plate, the case is probably broken by impact when falling during transport or during carrying. When the disk storage case is broken, broken pieces probably damage the disk.

To solve the problem, the present inventor has proposed a "disk storage cover" by which the disk storage case can be exhibited and protected from the impact (Utility Model Registration No. 3069751). This "disk storage cover" is constituted by integrally forming one plate material by bending processing in such a manner that the disk is taken in or out via a front opening.

SUMMARY OF THE INVENTION

The present invention has been developed in consideration of the present circumstances, and provides the following object disk storage case picture frame type covers.

One of objects of the present invention is to provide a picture frame type cover for a disk storage case, in which the disk storage case is inserted as it is so that a photograph or a picture printed on a jacket can be appreciated.

Another object of the present invention is to provide a picture frame type cover for a disk storage case, via which the disk storage case is easily taken in or out.

Still another object of the present invention is to provide a picture frame type cover for a disk storage case, which is easy to manufacture and is inexpensive.

Further object of the present invention is to provide a picture frame type cover for a disk storage case, by which CD desired to be listened to can freely be taken out of the case and listened to.

Still further object of the present invention is to provide a picture frame type cover for a disk storage case which prevents breakage by impact.

In order to achieve the aforementioned objects the present invention is constituted as follows. Specifically, a picture frame type cover includes: a front surface frame provided with an opening so that a picture, photograph, and the like of a jacket can be seen; an upper press plate disposed via an upper surface plate connected to an upper end of the front surface frame; and a lower press plate disposed via a lower surface plate connected to a lower end of the front surface frame, and a stopper is formed on one end of the lower surface plate. A width dimension of the upper surface plate or the lower surface plate is formed to be substantially the same as or slightly larger than a thickness dimension of the disk storage case. To form the disk storage case by a metal plate, the case can be formed from one plate member by bending processing. The disk storage case is inserted and held between the front surface frame and the upper press plate and lower press plate from an opening of a side surface on which no stopper is formed.

For a shape of the opening of the front surface frame, in addition to a square shape, an arbitrary shape can be determined. A material for forming the picture frame type cover is not particularly limited as long as the material is provided with a spring action for holding the inserted disk storage case, but aluminum is preferable from appearance, durability, and the like. When the disk storage case is formed of aluminum, the case is protected from impact, lightweight, and convenient to carry.

In order to exhibit the disk storage case like a photograph stand, the lower press plate is provided with a support leg formed by cutting off three ways by a slit. For a direction of the support leg, the support leg may be formed in either a horizontal direction or a vertical direction. Moreover, one support leg may be formed, but it is preferable to form two legs in consideration of stability when the cover stands. By disposing the support leg in this manner, the photograph, picture, or the like of the jacket inserted in the storage case for various disks such as CD, MD, DVD can be exhibited as a part of interior design and appreciated.

Moreover, a through hole is formed in the upper press plate together in the support leg, or independently of the support leg. The through hole is preferably formed in a bulging portion disposed on the upper press plate. When the bulging portion is disposed in this manner, a head of a thumbtack or a pin can be embedded. Moreover, instead of the through hole, the upper press plate may be provided with a turned piece constituted by cutting three ways by a slit. The turned piece can also be disposed on the upper surface plate together with the upper press plate or instead of the upper press plate.

BRIEF DESCRIPTION OF THE DRAWINGS

Various objects and advantages of the present invention described above will fully be understood by referring to the following description and drawings.

DESCRIPTION OF PREFERRED EMBODIMENTS

Figure 1:
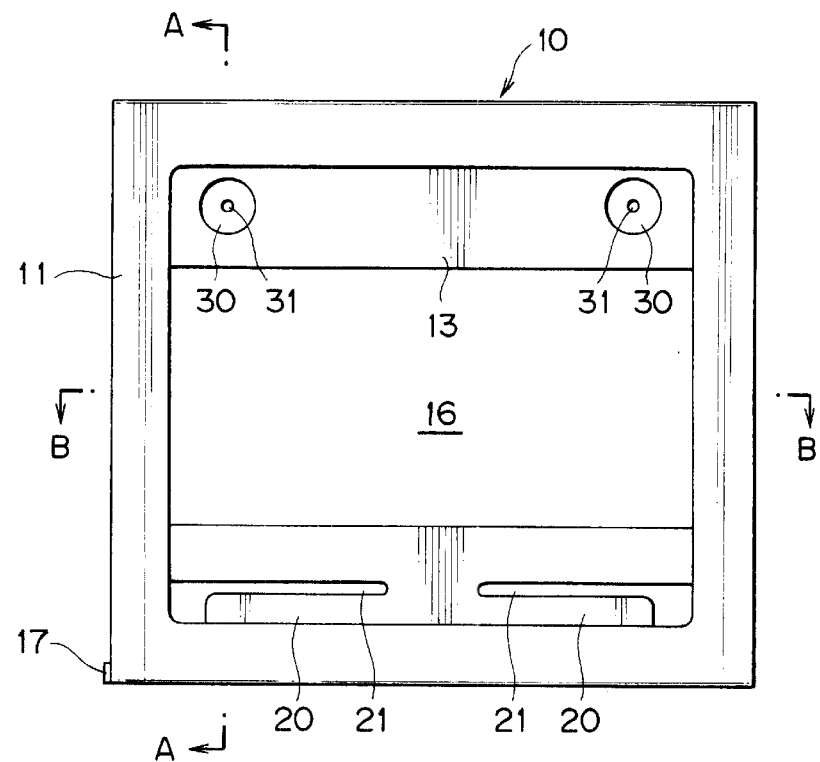
FIG. 1 is a front view of a first embodiment of the present invention.
Figure 2:
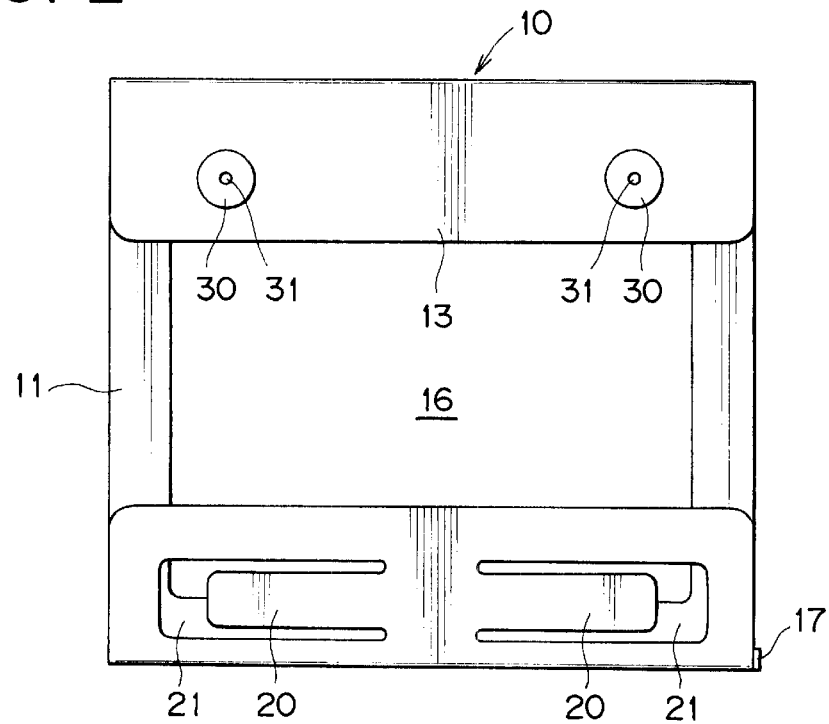
FIG. 2 is a back view of the first embodiment.
Figure 3:
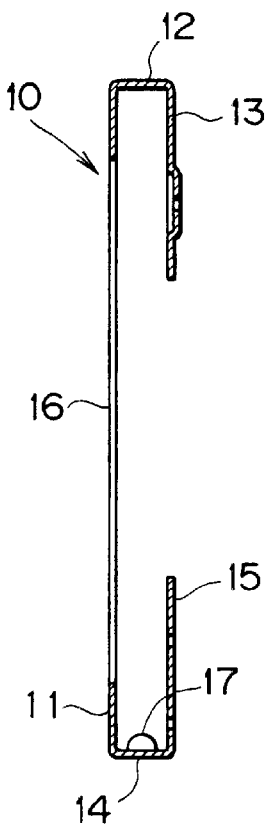
FIG. 3 is a sectional view taken along line A—A of FIG. 1.
Figure 4:
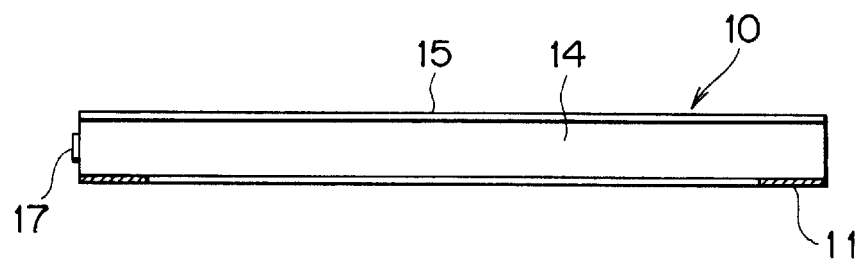
FIG. 4 is a sectional view taken along line B—B of FIG. 1.
Figure 5:
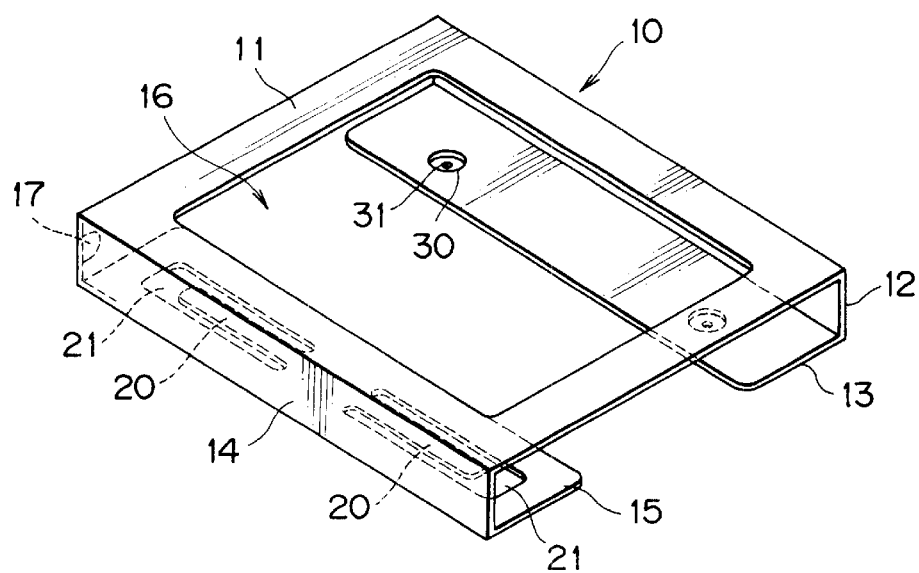
FIG. 5 is a perspective view seen from a front surface.

A picture frame type cover for a disk storage case according to the present invention will be described hereinafter in detail with reference to the drawings.

FIGS. 1 to 5 show a first embodiment of the present invention.

A picture frame type cover 10 is provided with an upper press plate 13 disposed via an upper surface plate 12 connected to an upper end of a front surface frame 11, and a lower press plate 15 disposed via a lower surface plate 14 connected to a lower end of the front surface frame 11. The upper press plate 13 and lower press plate 15 are formed substantially parallel to the front surface frame 11, respectively. The front surface frame 11 is a frame member like a picture frame in which an opening 16 is formed in a middle portion, and a width dimension of the upper surface plate 12 or the lower surface plate 14 is formed to be substantially the same as or slightly larger than a thickness dimension of the disk storage case. Both side surfaces of the picture frame type cover 10 are open, but a stopper 17 is protruded from one edge of the lower surface plate 14. When the picture frame type cover 10 is formed by a plate of aluminum or another metal, the cover can be formed from one plate-like material by bending processing.

Since intervals for width dimensions of the upper surface plate 12 and lower surface plate 14 are formed between the front surface frame 11 and the upper press plate 13 and lower press plate 15, the disk storage case may be inserted via an opening of a side surface from which no stopper 17 is protruded. The inserted disk storage case is engaged by the stopper 17, and securely held by a spring action of the upper press plate 13 and lower press plate 15.

The lower press plate 15 is provided with support legs 20, 20 for standing the picture frame type cover 10. The support legs 20, 20 are structured by cutting off three ways by slits 21, 21, connected to each other in the middle portion of the lower press plate 15, and formed symmetrically in a horizontal direction. In use, the support legs 20, 20 may be bent from a connected portion and protruded to the outside. Additionally, a slit shape is not limited to that of the shown embodiment, and an arbitrary shape can be formed. Moreover, instead of symmetrically forming the support legs 20 in the horizontal direction, the support leg may be formed only on one side.

Moreover, bulging portions 30, 30 are formed in the vicinity of both ends of the upper press plate 13, and through holes 31, 31 are formed substantially in middle portions of the bulging portions 30, 30. By inserting a thumbtack or a pin into the through hole 31, the cover can be attached to a wall surface or the like. Since a head of the thumbtack or the pin can be embedded in the bulging portions 30, 30, the cover with the disk storage case inserted therein can easily be attached to the wall surface or the like and displayed. Additionally, the through holes 31, 31 may be formed directly in the upper press plate 13, not via the bulging portions 30, 30.

Figure 6:
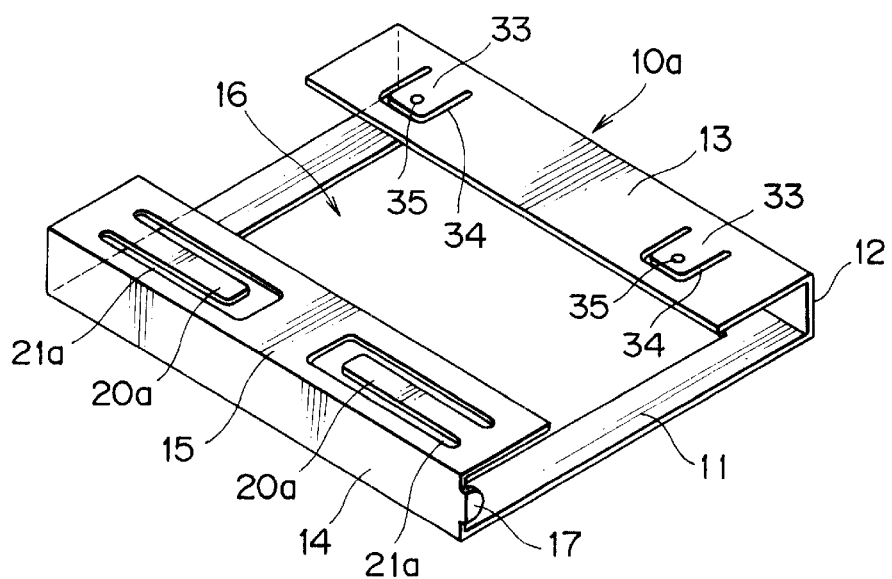
FIG. 6 is a perspective view seen from a back surface according to a second embodiment.

FIG. 6 is a perspective view of a picture frame type cover 10a according to a second embodiment of the present invention. The embodiment is different from the first embodiment only in constitutions of a support leg 20a formed on the lower press plate 15 and a turned piece 33 formed on the upper press plate 13. Therefore, the same constitution is denoted with the same reference numeral, and description thereof is omitted.

The support leg 20a is the same as the support leg 20 in that three ways are cut off and formed by slits 21a, 21a, but different therefrom in that the legs are connected to each other in both ends of the lower press plate 15 and formed in a direction opposite to that of the support leg 20. The support leg 20a is also formed horizontally in the horizontal direction, but may be formed only on one side without being symmetrically formed in the horizontal direction.

Moreover, the turned piece 33 is formed, similarly as the support leg, by cutting three ways by a slit 34 and connecting the side of the upper surface plate 12, and a through hole 35 is formed in a tip end. The turned piece 33 is usually formed on the same plane as that of the upper press plate 13, during use the piece is bent upward from its root, and the cover is attached by inserting a hook or a pin into the through hole 35 or hung by passing a string through the hole.

Figure 7:
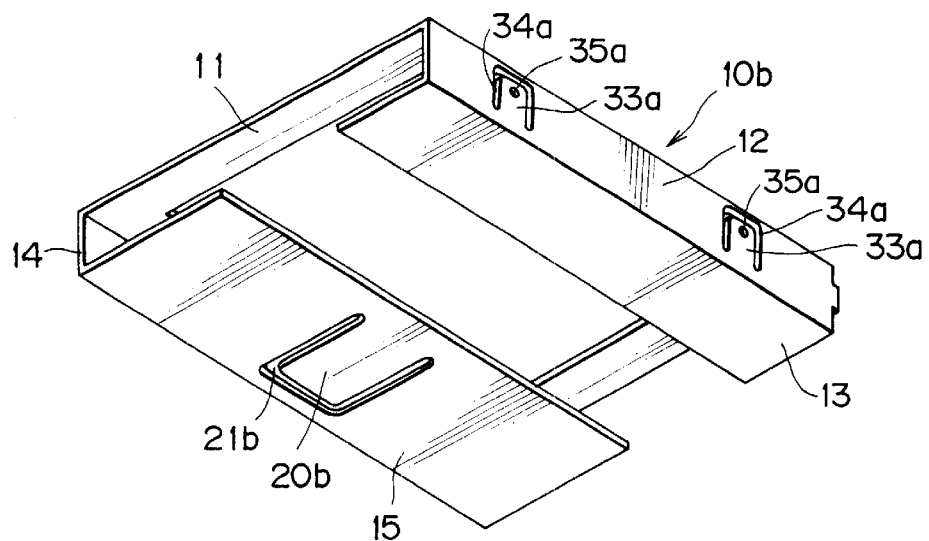
FIG. 7 is a perspective view seen from the back surface according to a third embodiment.

FIG. 7 is a perspective view of a picture frame type cover 10b according to a third embodiment of the present invention. The embodiment is different from the first embodiment only in constitutions of a support leg 20b formed on the lower press plate 15 and a turned piece 33a formed on the upper surface plate 12. Therefore, the same constitution is denoted with the same reference numeral and description thereof is omitted.

The support leg 20b is formed substantially on the middle portion of the lower press plate 15 in a vertical direction. Specifically, three ways are cut off by a slit 21b, and the leg is connected to the lower press plate 15 in its upper end. To use the support leg 20b, the leg is bent from the connected portion in such a manner that its tip end is protruded to the outside. Additionally, two or more support legs 20b may be formed.

The turned piece 33a is constituted similarly as the turned piece 33, and formed by cutting off three ways by a slit 34a, and connecting the side of the upper press plate 13, and a through hole 35a is formed in the tip end. The turned piece 33a is usually formed on the same plane as that of the upper surface plate 12, and bent upward from its root during use so that the cover may be attached by inserting the hook or the pin into the through hole 35a, or hung by passing the string through the hole.

Figure 8:
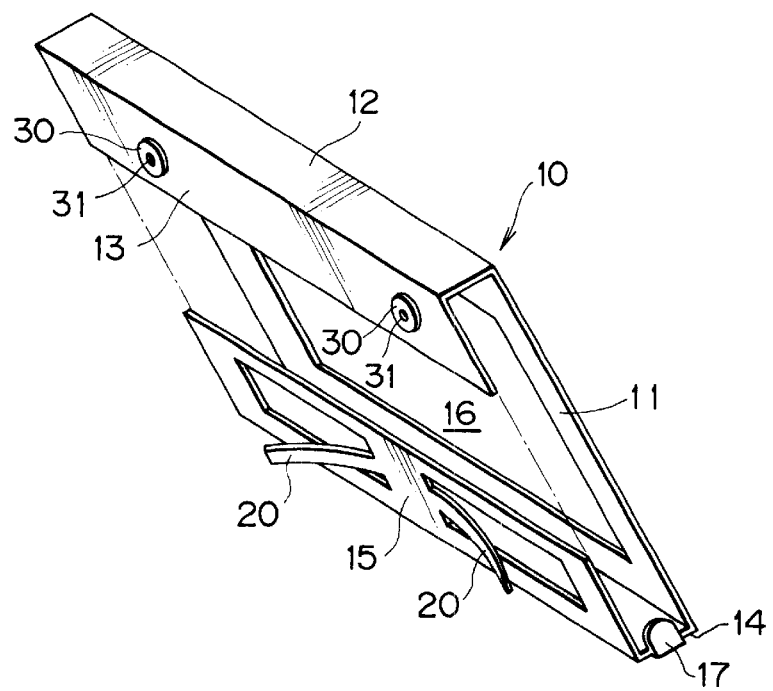
FIG. 8 is a perspective view showing a use state according to the first embodiment.

FIG. 8 next shows one example of a use state of the picture frame type cover 10 of the first embodiment. As clearly seen from the drawing, the support leg 20 is bent from its root, the tip end thereof is protruded to the outside, and the cover stands like a photograph stand.

For the support leg of the lower press plate, the through hole and turned piece of the upper press plate and the turned piece of the upper surface plate in the aforementioned embodiment, either one may only be formed, or these may appropriately be combined and formed.

The picture frame type cover for the disk storage case according to the present invention can be formed by aluminum or another metal, but when the cover is entirely formed by a transparent or translucent material, or at least the front surface frame is formed by the transparent or translucent material, the inserted disk case can be seen also from the front surface frame 11.

Additionally, in the aforementioned embodiments, for the shape of the opening 16 of the front surface frame 11, the formation in the square shape has been described, but the shape of the opening 16 is not limited to the square shape, and a heart shape, a diamond shape, or another arbitrary shape can be formed. Moreover, the opening 16 may be formed of a plurality of windows. When the opening 16 is constituted of the plurality of windows, the respective arbitrary shapes can be combined. Furthermore, for the material of the picture frame type cover, the cover can be formed by synthetic resin, aluminum, paper or another arbitrary material as long as the cover is provided with the spring action.

As described above, according to the picture frame type cover for the disk storage case of the present invention, the storage case for various disks such as CD, MD and DVD is inserted into the cover to frame a peripheral edge of the jacket, the cover is used as if it were a picture frame, and the photograph, picture or the like of the jacket can be appreciated as a part of interior design. Moreover, by utilizing the support leg or the like, the cover can be displayed in an arbitrary place. Since an interval between the upper press plate and the lower press plate is open, and both side surfaces are also open, the disk storage case can easily be taken in or out only by sliding the case. Furthermore, the disk storage case can also be inserted in the picture frame type cover and carried. The picture frame type cover protects the disk storage case from any impact, and can prevent breakage even when falling.

Additionally, according to the picture frame type cover for the disk storage case of the present invention, in a rental shop in which music or movie is lent on business, the cover can also be used as a display case cover. Specifically, a disk title sheet is inserted between the disk storage case and the upper press plate and lower press plate, and exhibited in a predetermined position on a showcase. A user can read letters put on the title sheet between the upper press plate and the lower press plate to confirm a disk content, and can see if the disk storage case is inserted, that is, if the disk is being rented. When the user rents out the disk, one may pull the disk storage case out of the picture frame type cover, return only the picture frame type cover back to the showcase, and bring the pulled disk storage case to a rent-out counter. Thereafter, rent-out is performed following a usual rent-out procedure.

What is claimed is:

1. A picture frame type cover for a disk storage case, comprising:
   a front surface frame provided with an opening;
   an upper press plate disposed via an upper surface plate connected to an upper end of said front surface frame;
   a lower press plate disposed via a lower surface plate connected to a lower end of said front surface frame; and
   a stopper, wherein the front surface frame, the upper press plate, the upper surface plate, the lower press plate and the lower surface plate are connected to form a generally C-shaped configuration defining an opposing pair of generally C-shaped openings and the stopper is formed on one end of the lower surface plate and projects into one of the pairs of generally C-shaped openings.

2. The picture frame type cover for the disk storage case according to claim 1 wherein the front surface frame, the upper press plate, the upper surface plate, the lower press plate and the lower surface plate are fabricated from an aluminum material.

3. The picture frame type cover for the disk storage case according to claim 1 wherein the opening is formed in a square shape.

4. The picture frame type cover for the disk storage case according to claim 1 or 2 wherein a support leg is formed on the lower press plate by a slit cut three ways.

5. The picture frame type cover for the disk storage case according to claim 1 or 2 wherein a support let is formed on the lower press plate by a slit cut three ways, and said support leg is formed in a horizontal direction.

6. The picture frame type cover for the disk storage case according to claim 1 or 2 wherein a support leg is formed on the lower press plate by a slit cut three ways, and said support leg is formed in a vertical direction.

7. The picture frame type cover for the disk storage case according to claim 1 or 2 wherein a through hole is formed in the upper press plate.

8. The picture frame type cover for the disk storage case according to claim 1 or 2 wherein the upper press plate is provided with a bulging portion, and a through hole is formed in said bulging portion.

9. The picture frame type cover for the disk storage case according to claim 1 or 2 wherein the upper press plate is provided with a turned piece by a slit cut three ways, and a through hole is formed in said turned piece.

10. The picture frame type cover for the disk storage case according to claim 1 or 2 wherein the upper surface plate is provided with a turned piece by a slit cut three ways and a through hole is formed in a said turned piece.

11. A picture frame type cover for a disk storage case, comprising:
    a front surface frame extending in a longitudinal direction and a lateral direction and having a thickness extending in a transverse direction being perpendicular to the longitudinal and lateral directions, the front surface frame defining an opening therethrough in the transverse direction;
    an upper surface plate connected to the front surface frame and extending in the longitudinal and transverse directions;
    an upper press plate connected to the upper surface plate and extending in the longitudinal and lateral directions;
    a lower surface plate connected to the front surface frame and extending in the longitudinal and transverse directions;
    a lower press plate connected to the lower surface plate and extending in the longitudinal and lateral directions, such that the front surface frame, the upper surface plate, the upper press plate, the lower surface plate and the lower press plate form in cross-section a generally C-shaped configuration defining an opposing pair of generally C-shaped openings sized to slidably receive the disk storage case; and
    at least one leg movable to and between a stowed position in which the at least one leg is positioned in a common plane with the lower press plate and an extended position in which the at least one leg is disposed away from the common plane a distance sufficient to support the picture frame type cover in a stand-up condition on a support surface.

12. A picture frame type cover for a disk storage case according to claim 11, wherein the upper press plate includes at least one through hole extending through the upper press plate in the transverse direction.

13. A picture frame type cover for a disk storage case according to claim 12, wherein the upper press plate includes a bulging portion, the through hole extending through the bulging portion.

14. A picture frame type cover for a disk storage case according to claim 12, wherein the upper press plate includes at least one turned piece movable between a closed position in which the turned piece is disposed in an upper common plane with one of the upper press plate and the upper surface plate and in an opened position in which the turned piece is moved away from the upper common plane, the through hole extending through the turned piece.

15. A picture frame type cover for a disk storage case according to claim 11, wherein when the at least one leg moves from the stowed position to the extended position, the at least one leg moves angularly away from the common plane.

16. A picture frame type cover for a disk storage case according to claim 11, further comprising a stopper connected to one of the front surface frame panel, the upper surface plate, the upper press plate, the lower surface plate and the lower press plate and projecting into one of the generally C-shaped openings.

* * * * *